US012479182B1

(12) United States Patent
Tsoi

(10) Patent No.: US 12,479,182 B1
(45) Date of Patent: Nov. 25, 2025

(54) SEALED BAG BASED ON FOLDING PROCESS AND PROCESSING METHOD THEREOF

(71) Applicant: Dongguan He Xin Packing Co., Ltd., Guangdong (CN)

(72) Inventor: Yam Man Tsoi, Guangdong (CN)

(73) Assignee: Dongguan He Xin Packing Co., Ltd., Dongguan (CN)

( * ) Notice: Subject to any disclaimer, the term of this patent is extended or adjusted under 35 U.S.C. 154(b) by 0 days.

(21) Appl. No.: 18/788,120

(22) Filed: Jul. 29, 2024

(30) Foreign Application Priority Data

May 28, 2024 (CN) ........................ 202410671945.X

(51) Int. Cl.
*B31B 70/00* (2017.01)
*B31B 70/26* (2017.01)
*B31B 155/00* (2017.01)

(52) U.S. Cl.
CPC ............ *B31B 70/004* (2017.08); *B31B 70/26* (2017.08); *B31B 2155/00* (2017.08)

(58) Field of Classification Search
CPC ... B31B 70/62; B31B 70/252; B31B 2160/20; B31B 70/04; B31B 70/26; B31B 70/261; B31B 2160/102; B31B 70/52; B31B 2150/001; B29C 2071/022; B29C 48/0018; B29C 48/08; B29C 71/02
USPC .......................................................... 493/442
See application file for complete search history.

(56) References Cited

U.S. PATENT DOCUMENTS

| | | | | |
|---|---|---|---|---|
| 5,782,733 A * | 7/1998 | Yeager | B65D 33/2575 | 493/213 |
| 2004/0234173 A1* | 11/2004 | Saad | B65D 33/01 | 383/63 |
| 2005/0286817 A1* | 12/2005 | Hall | B65D 33/2508 | 383/105 |
| 2006/0128543 A1* | 6/2006 | Sekine | B65H 45/16 | 493/355 |
| 2010/0190627 A1* | 7/2010 | Ishizuka | B31B 50/00 | 493/128 |
| 2018/0155086 A1* | 6/2018 | Tiepelman | B29C 66/83411 | |
| 2019/0106257 A1* | 4/2019 | Broen | B65D 75/5838 | |
| 2021/0060888 A1* | 3/2021 | Resch | B65B 51/10 | |

* cited by examiner

*Primary Examiner* — Jacob A Smith

(57) ABSTRACT

Disclosed is a sealed bag and a processing method thereof, the method including presetting a folding baseline on a base paper piece, and performing a first plastic sealing on a gap between an overlapping area of the second folding portion and the first folding portion so as to form a paper roll; supporting the paper roll so as to perform side pressing on the paper roll so that the paper roll is embedded to form a first closing and a third folding line, wherein the area between the first folding line and the first side pressing line serves as a bottom surface of the first closing, and the area between the first side pressing line and the third folding line serves as a top surface of the first closing; plastically sealing the bottom opening of the fully pressed paper roll to form a finished sealed bag.

17 Claims, 2 Drawing Sheets

SEALED BAG BASED ON FOLDING PROCESS AND PROCESSING METHOD THEREOF

CROSS REFERENCES TO RELATED APPLICATION

The present invention claims the benefit of Chinese Patent Application No. 202410671945.X filed on May 28, 2024, the contents of which are incorporated herein by reference in their entirety.

TECHNICAL FIELD

The present invention relates to the technical field of packaging processing, and in particular to a sealed bag based on a folding process and a processing method thereof.

BACKGROUND ART

Existing sealed bag design and manufacturing techniques mainly have problems such as excessive material use for sealed bags, insufficient sealing performance, complicated manufacturing processes, and poor user experience. An imbalance in the structural design of existing sealed bags can cause the bag to deform or break during use, affecting its overall stability. In addition, partially sealed bags are overly wasteful of material usage, not only increasing costs but also reducing the portability of the package. Sealing performance is also an aspect of the prior art that needs to be improved, and the bottom seal design of some sealed bags may not be tight enough, resulting in leakage of the contents, thereby affecting product safety and consumer confidence. At the same time, complex opening and closing designs make the user experience poor, especially in situations where rapid and frequent use is required. The complexity of the production process may result in a low degree of automation, thereby reducing production efficiency and increasing labor costs. In response to these problems, new is necessary to develop new designs and technologies to improve the balance, portability, sealing performance, and production efficiency of the sealed bag, thereby improving the overall technical effect.

SUMMARY OF THE INVENTION

Embodiments of the present invention provide a sealed bag based on a folding process and a processing method thereof, aiming to solve the problem that the capacity and quality of the sealed bag cannot be effectively balanced in the prior art methods.

In a first aspect, the embodiments of the present invention disclose a processing method of a sealed bag based on a folding process, wherein presetting a folding baseline on an upper surface of a tiled base paper piece, the folding baseline being parallel to a first edge line and a second edge line of the base paper piece, a part of the surface between the first edge line and the folding baseline being a first folding portion, and a part of the surface between the second edge line and the folding baseline being a second folding portion; folding a part of the base paper piece on the left side of the folding baseline according to a preset first folding line so that the first edge line falls on the right side of the folding baseline, folding the part of the base paper piece on the right side of the folding baseline according to a preset second folding line so that the second edge line falls on the left side of the folding baseline and the first edge line, and pressing part of the surface of the second folding portion onto the first folding portion; performing a first plastic sealing on a gap between an overlapping area of the second folding portion and the first folding portion so as to form a paper roll with two ends open and side surfaces enclosed; supporting the paper roll and performing side pressing on the paper roll along a first side pressing line preset on the paper roll so that the paper roll is embedded to form a first closing and a third folding line, wherein the area between the first folding line and the first side pressing line serves as a bottom surface of the first closing, and the area between the first side pressing line and the third folding line serves as a top surface of the first closing; performing side pressing on the paper roll along a second side pressing line preset on the paper roll so that the paper roll is embedded to form a second closing and a fourth folding line, wherein the area between the second folding line and the second side pressing line serves as a bottom surface of the second closing, and the area between the second side pressing line and the fourth folding line serves as a top surface of the second closing; fully pressing the paper roll to remove air so that the projection of the third folding line falls on the first folding line and the projection of the fourth folding line falls on the second folding line; plastically sealing the bottom opening of the fully pressed paper roll according to a preset bottom folding line to form a finished sealed bag.

Further, a part of the surface of the second folding portion is pressed on the first folding portion to form a sealing portion having a width of 1-5 cm.

Further, prior to the first plastic sealing, the method further includes: the area where the second folding portion overlaps the first folding portion is provided as a gumming area, and the gumming area is coated with a plastic sealant, and the width of the gumming area is 2-6 cm.

Further, the first plastic sealing includes thermocompression, wherein the thermocompression temperature is 100-350° C. and the thermocompression pressure is 8-20 $kg/dm^2$.

Further, the time period of the thermocompression is 1-4 seconds.

In a second aspect, the embodiments of the present invention also disclose a sealed bag based on a folding process, which is obtained by processing and manufacturing the above-mentioned processing method of a sealed bag based on a folding process, wherein the sealed bag includes a first closing and a second closing arranged at two sides of a bag body, the first closing includes a bottom surface and a top surface which are symmetrical according to a first side pressing line, wherein two sides of the bottom surface of the first closing are a first side pressing line and a first folding line, respectively, and two sides of the top surface of the first closing are a first side pressing line and a third folding line, respectively; the second closing includes a bottom surface and a top surface which are symmetrical according to a second side pressing line, two sides of the bottom surface of the second closing are a second side pressing line and a second folding line, respectively, and two sides of the top surface of the first closing are a second side pressing line and a fourth folding line, respectively.

Further, the sealed bag includes a bottom plastic sealing area arranged at the bottom of the bag body, the bottom plastically seals area plastically seals the bottom opening of the fully pressed paper roll according to a preset bottom folding line.

Further, the area of the top surface and bottom surface of the first closing is equal, the area of the top surface and bottom surface of the second closing is equal, the area of the top surface of the first closing and the area of the top surface of the second closing is equal, and the area of the top surface of the first closing is 10%-20% of the area of the first folding portion.

The closing design of the sealed bag described above plays a key role in ensuring bag capacity and quality. With a compact structure, the closing design allows the bags to be stored more compactly when folded or stacked, thereby saving storage space and reducing transportation costs. This design is particularly suitable for portable products, such as cosmetic bags, snack bags, etc. which can be easily placed in the bag or carried on the body, providing greater convenience, effectively taking into account the capacity and quality of the sealed bag, not only improving the practicality and convenience of the product, but also enhancing customer well-being and loyalty, and also helping to enhance brand awareness and image.

BRIEF DESCRIPTION OF THE DRAWINGS

In order to more clearly illustrate the technical solutions of the embodiments of the present invention, a brief description will be given below with reference to the accompanying drawings which are used in the description of the embodiments. It is obvious that the drawings in the description below are some embodiments of the present invention, and other drawings can be obtained from these drawings by a person skilled in the art without involving any inventive effort.

REFERENCE NUMERALS

1. folding baseline; 11, first edge line; 12, second edge line; 100, first folding portion;
200, second folding portion; 21, first folding line; 22, second folding line; 31, first side pressing line; 101, first closing; 23, third folding line; 32, second side pressing line; 102, second closing; 24, fourth folding line; 13, bottom folding line; 110, position of the first edge line after the first plastic sealing; 120, position of the second edge line after the first plastic sealing; 300, sealing portion; 400, bottom plastic sealing area.

DETAILED DESCRIPTION OF THE INVENTION

The embodiments of the present invention will now be described more fully hereinafter with reference to the accompanying drawings, in which some, but not all embodiments of the invention are shown. Based on the embodiments of the present invention, all other embodiments obtained by a person of ordinary skill in the art without inventive effort fall within the scope of the present invention.

It will be understood that the terms "comprise" and "include", when used in this specification and the appended claims, specify the presence of stated features, integers, steps, operations, elements, and/or components, but do not preclude the presence or addition of one or more other features, integers, steps, operations, elements, components, and/or groups thereof.

It is also to be understood that the terminology used in the description of the invention herein is for the purpose of describing particular embodiments only and is not intended to be limiting of the invention. As used in the description of the invention and the appended claims, the singular forms "a", "an", and "the" are intended to include the plural forms as well, unless the context clearly indicates otherwise.

It should be further understood that the term "and/or" as used in the present specification and appended claims refers to and includes any and all possible combinations of one or more of the associated listed items.

Figure 1:
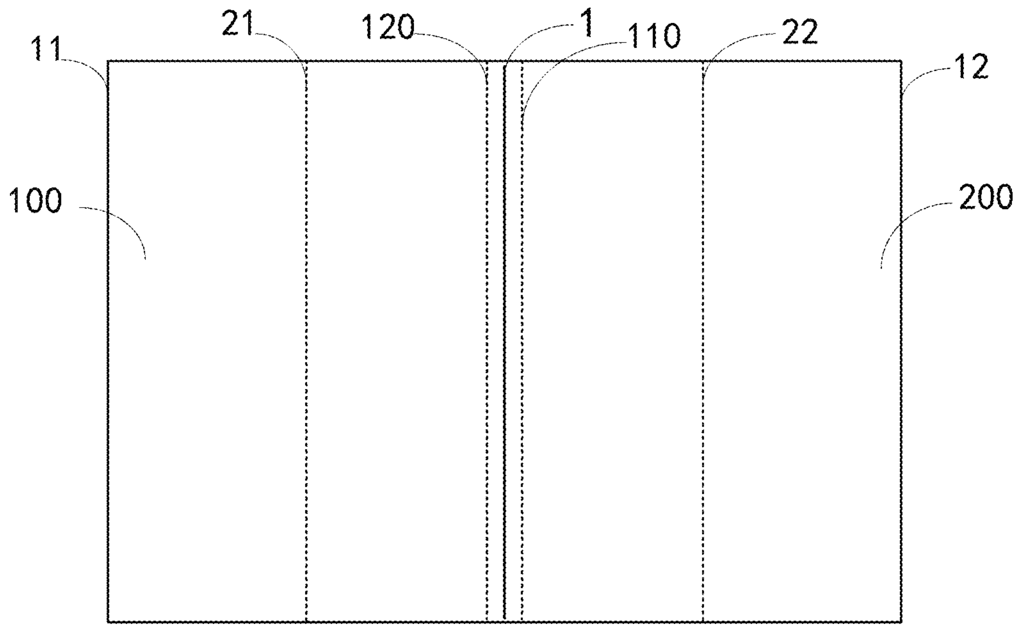
FIG. 1 is a schematic view of the layout of a base paper piece of a sealed bag based on a folding process provided by an embodiment of the present invention.
Figure 2:
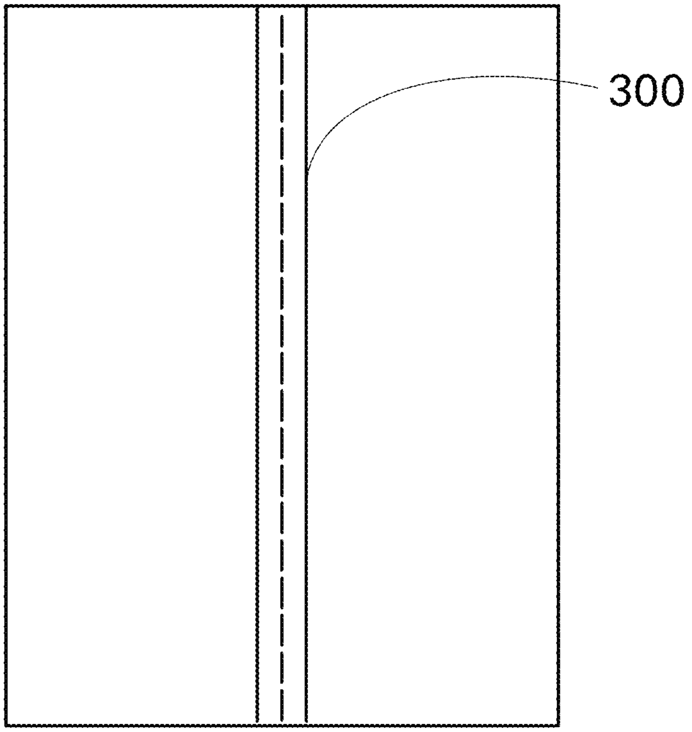
FIG. 2 is a schematic view of the layout of a sealed bag based on a folding process after a first plastic sealing provided by an embodiment of the present invention.
Figure 3:
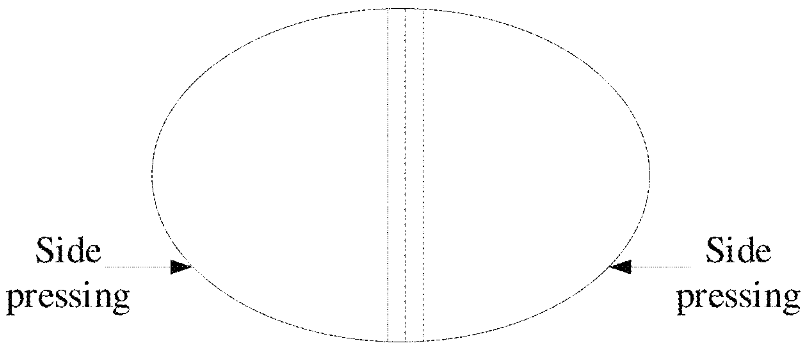
FIG. 3 is a schematic front cross-sectional view of a paper roll provided by an embodiment of the present invention.
Figure 4:
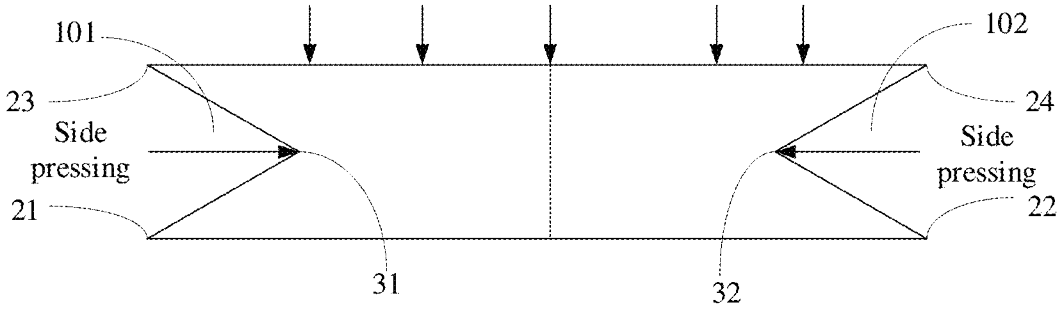
FIG. 4 is a schematic front cross-sectional view of a paper roll being side-pressed on both sides provided by an embodiment of the present invention.
Figure 5:
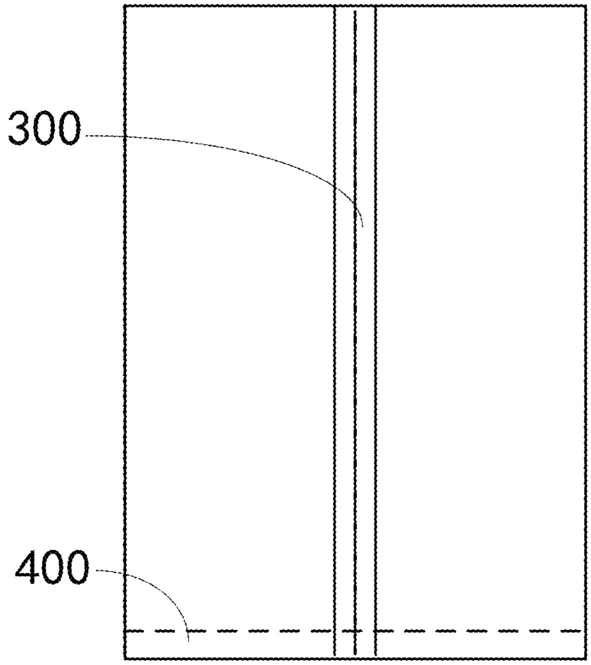
FIG. 5 is a schematic plan view of a sealed bag based on a folding process provided by an embodiment of the present invention.

As shown in FIGS. 1 to 5, in a first aspect, an embodiment of the present invention discloses a processing method of a sealed bag based on a folding process, wherein a folding baseline 1 is preset on an upper surface of a tiled base paper piece, the folding baseline 1 is parallel to a first edge line 11 and a second edge line 12 of the base paper piece, a part of the surface between the first edge line 11 and the folding baseline 1 is a first folding portion 100, and a part of the surface between the second edge line 12 and the folding baseline 1 is a second folding portion 200; folding the part of the base paper piece located on the left side of the folding baseline 1 according to a preset first folding line 21 so that the first edge line 11 falls on the right side of the folding baseline 1, folding the part of the base paper piece located on the right side of the folding baseline 1 according to a preset second folding line 22 so that the second edge line 12 falls on the left side of the folding baseline 1 and the first edge line 11, and pressing part of the surface of the second folding portion 200 onto the first folding portion 100; performing a first plastic sealing on the gap between the overlapping area of the second folding portion 200 and the first folding portion 100 to form a paper roll with two ends open and side surfaces enclosed; supporting the paper roll so as to perform side pressing on the paper roll along a preset first side pressing line 31 preset on the paper roll so that the paper roll is embedded to form a first closing 101 and a third folding line 23, wherein the region between the first folding line 21 and the first side pressing line 31 serves as a bottom surface of the first closing 101, and the region between the first side pressing line 31 and the third folding line 23 serves as a top surface of the first closing 101; side pressing the paper roll along a second side pressing line 32 preset on the paper roll so that the paper roll is embedded to form a second closing 102 and a fourth folding line 24, wherein a region between the second folding line 22 and the second side pressing line 32 serves as a bottom surface of the second closing 102, and a region between the second side pressing line 32 and the fourth folding line 24 serves as a top surface of the second closing 102; completely pressing the paper roll to remove air so that the projection of the third folding line 23 falls on the first folding line 21 and the projection of the fourth folding line 24 falls on the second folding line 22; the bottom opening of the fully pressed paper roll is plastically sealed according to a predetermined bottom folding line 13 to form a finished sealed bag.

In the actual implementation, plastic sealing refers to plastic packaging, which can be performed for most flexible materials. Firstly, a base paper piece is laid on an operating platform, and a folding baseline 1 is preset on the upper surface of the film, and the folding baseline 1 can be flexibly preset and adjusted according to the requirements of the finished product. These center lines need to be parallel to the first edge line 11 and the second edge line 12 of the base paper piece. The preset folding baseline 1 will guide the subsequent folding operation. Next, the part of the base paper piece on the left side of the folding baseline 1 is folded according to the preset first folding line 21 so that the first edge line 11 is folded to the right side of the folding baseline 1. Then, the part of the base paper piece on the right side of the folding baseline 1 is folded according to the predetermined second folding line 22 so that the second edge line 12 is folded to the left side of the folding baseline 1 and the first edge line 11. Thus, the first folding portion 100 and the second folding portion 200 are formed. A part of the surface of the second folding portion 200 is then pressed against the first folding portion 100 to form a sealing portion 300. This sealing portion 300 is a key part of the sealed bag for ensuring the sealability of the sealed bag. After that, the gap between the overlapping areas of the second folding portion 200 and the first folding portion 100 is first plastically sealed to form a paper roll with two ends open and side surfaces enclosed. This step may be performed by thermocompression, gluing, etc. The paper roll is then so that the enclosed roll can be forced laterally. The air introduction can be achieved by means of special equipment, such as the use of a cylindrical deck to nest the paper rolls on the outside of the deck, ensuring the formation and stability of the paper rolls. Next, the paper roll is side-pressed along a predetermined first side pressing line 31 to form the first closing 101 and the third folding line 23. A region between the first folding line 21 and the first side pressing line 31 serves as a bottom surface of the first closing 101, and a region between the first side pressing line 31 and the third folding line 23 serves as a top surface of the first closing 101. Similarly, the paper roll is side-pressed along a predetermined second side pressing line 32 to form the second closing 102 and the fourth folding line 24. The area between the second folding line 22 and the second side pressing line 32 serves as a bottom surface of the second closing 102, and the area between the second side pressing line 32 and the fourth folding line 24 serves as a top surface of the second closing 102.

The roll is then fully pressed and the air is removed from the center of the paper roll. This step may be performed by thermocompression, mechanical compression, or the like. After being completely pressed together, the projections of the third folding line 23 and the fourth folding line 24 fall on the first folding line 21 and the second folding line 22, respectively, i.e. the third folding line 23 adjoins the first folding line 21 and the fourth folding line 24 adjoins the second folding line 22, forming a complete sealed bag structure. Finally, the bottom opening of the fully compressed paper roll is plastically sealed according to a predetermined bottom folding line 13 to form the finished sealed bag. This step may be performed using thermocompression, gluing, etc. to ensure the bottom tightness of the sealed bag. Through the above steps, it is possible to produce a sealed bag with a strong structure and good sealability, which is suitable for various packaging requirements. At the same time, the process can also improve production efficiency and reduce costs.

In summary, the closing design of the sealed bag plays a key role in ensuring bag capacity and quality. With a compact structure, the closing design allows the bags to be stored more compactly when folded or stacked, thereby saving storage space and reducing transportation costs. This design is particularly useful for portable products, such as cosmetic bags, snack bags, etc. which can be easily placed in the bag or carried on the body, providing greater convenience.

At the same time, the quality of the sealed bag is also compromised by the closing design. By adding additional folds or reinforcing layers at the closings, the structural strength of the bag for use in containing objects can be enhanced, making the bag more durable and wear-resistant. This design not only improves the practicality of the product but also fits the usage habits of customers. In addition, the closing design allows for aesthetics. By careful design of the shape and location of the closings, the bag can be made to look more delicate and level to attract the attention of the consumer. A unique and ingenious closing design can give a profound impression and help to establish brand recognition. The closing design is also simple and easy to implement in the production process and does not require complex machinery or materials. The bag can be easily folded into the desired shape and size by precise creasing and stitching. At the same time, the closing is easy to clean and maintain during the use of the bag. In conclusion, the closing design of the sealed bag plays an important role in ensuring capacity and quality, which not only improves the practicality and convenience of the product, but also enhances the customer's well-being and loyalty, and also helps to improve the brand's popularity and image.

Further, a part of the surface of the second folding portion 200 is pressed on the first folding portion 100 to form a sealing portion 300 having a width of 1-5 cm.

Further, prior to the first plastic sealing, the method further includes: the area where the second folding portion 200 overlaps the first folding portion 100 is provided as a gumming area, and the gumming area is coated with a plastic sealant, and the width of the gumming area is 2-6 cm. Further, the first plastic sealing includes thermocompression, wherein the thermocompression temperature is 100-350° C. and the thermocompression pressure is 8-20 $kg/dm^2$.

Further, the time period of the thermocompression is 1-4 seconds.

The width of the sealing portion 300 is designed to be 1-5 cm, and this range can ensure the sealing performance of the sealed bag while facilitating handling and sealing by the user. The area where the second folding portion overlaps the first folding portion is provided with a gumming area, and a plastic sealant is coated on an area where the second folding portion overlaps the first folding portion. Such a design can improve the adhesive strength of the sealing portion 300 and ensure long-term sealing performance. The width of the gumming area is 2-6 cm, sufficient to cover the overlapping area to ensure the adhesive effect.

The first plastic sealing is generally performed by means of thermocompression, the temperature and pressure parameters of which are set at 100-350° C. and 8-20 $kg/dm^2$, which conditions ensure that the material of the paper is well deformed and bonded during the plastic sealing process to form a strong sealing portion 300. The time period of thermocompression is 1-4 seconds, depending on the material properties of the paper and the desired bond strength. These detailed process parameters and technical measures together constitute the processing method of a sealed bag based on a folding process, which ensures the sealability, durability, and user-friendliness of the sealed bag, while also improving the production efficiency and product quality. Through these fine controls, sealed bags can be produced that meet the needs of various application scenarios, whether food packaging, cosmetic packaging, or industrial product packaging.

In a second aspect, the embodiments of the present invention also disclose a sealed bag based on a folding process, which is obtained by processing and manufacturing the above-mentioned processing method of a sealed bag based on a folding process, wherein the sealed bag includes a first closing 101 and a second closing 102 arranged at two sides of a bag body, the first closing 101 includes a bottom surface and a top surface which are symmetrical according to a first side pressing line 31, the two sides of the bottom surface of the first closing 101 are a first side pressing line 31 and a first folding line 21, respectively, and the two sides of the top surface of the first closing 101 are a first side pressing line 31 and a third folding line 23, respectively; the second closing 102 includes a bottom surface and a top surface which are symmetrical according to the second side pressing line 32, two sides of the bottom surface of the second closing 102 are the second side pressing line 32 and the second folding line 22, respectively, and two sides of the top surface of the first closing 101 are the second side pressing line 32 and the fourth folding line 24, respectively.

Further, the sealed bag includes a bottom plastic sealing area 400 arranged at the bottom of the bag body, the bottom plastic sealing area 400 plastically seals the bottom opening of the fully pressed paper roll according to a preset bottom folding line 13.

Preferably, after the bottom plastic sealing area 400 is completed, the bottom plastic sealing area 400 is folded up a second time along the original bottom edge line so that the bottom plastic sealing area 400 becomes more flexible to facilitate the transportation of the bag body.

Further, the area of the top surface and the bottom surface of the first closing 101 is equal, the area of the top surface and the bottom surface of the second closing 102 is equal, the area of the top surface of the first closing 101 and the area of the top surface of the second closing 102 is equal, and the area of the top surface of the first closing 101 is 10%-20% of the area of the first folding portion 100.

The sealed bag is manufactured by the processing method of the first aspect. The structural design of the sealed bag is designed to provide an optimized packaging solution that both meets functional requirements and provides a good user experience.

The sealed bag includes a first closing 101 and a second closing 102 arranged on both sides of the bag body. These closings are critical parts of the sealed bag and they are formed by a folding and pressing process to ensure the sealing properties of the bag. The first closing 101 includes a bottom surface and a top surface symmetrical according to the first side pressing line 31. On both sides of the bottom surface are a first side pressing line 31 and a first folding line 21, respectively, and on both sides of the top surface are a first side pressing line 31 and a third folding line 23, respectively. This design allows the first closing 101 to have a stable configuration while facilitating the removal of the contents. The second closing 102 also includes a bottom surface and a top surface that are symmetrical according to the second side pressing line 32. On both sides of the bottom surface are a second side pressing line 32 and a second folding line 22, respectively, and on both sides of the top surface are a second side pressing line 32 and a fourth folding line 24, respectively. The design of the second closing 102 is similar to the first closing 101, ensuring the overall structural strength and sealing performance of the sealed bag.

Further, the sealed bag also includes a bottom plastic sealing area 400 disposed at the bottom of the bag body. This area is a plastic sealing of the bottom opening of the fully pressed paper roll according to a predetermined bottom folding line 13 to ensure that the bottom is sealed to prevent objects (e.g. rice) inside it from breaking through the bottom of the bag body under the force of gravity to leak. In addition, the top surface and bottom surface of the first and second closings 101, 102 are equal in area, which ensures stability and balance of the closings. The area of the top surface of the first closing 101 and the area of the top surface of the second closing 102 are equal, which means that the two closings are structurally balanced, helping to maintain the overall stability of the bag. The area of the top surface of the first closing 101 is 10%-20% of the area of the first folding portion 100, and this design ensures that the closing portion is not too weak at the same time is not too heavy to optimize the portability and strength of the overall package. In view of the above, embodiments of the present invention provide a design of a sealed bag based on a folding process, which achieves an optimized structure and a balanced sealing performance through a fine folding and pressing process, is not easily broken when containing heavy objects, improves the load-bearing capacity of the bag body, and ensures user-friendliness and packaging efficiency.

Although the present invention has been described with reference to the preferred embodiments, it should be understood by those skilled in the art that various changes may be made and equivalents may be substituted for elements thereof without departing from the scope of the invention. Accordingly, the protection sought herein is as set forth in the claims below.

The invention claimed is:

1. A processing method of a sealed bag based on a folding process, comprising:

presetting a folding baseline on an upper surface of a tiled base paper piece, the folding baseline being parallel to a first edge line and a second edge line of the base paper piece, a part of the surface between the first edge line and the folding baseline being a first folding portion, and a part of the surface between the second edge line and the folding baseline being a second folding portion;

folding a part of the base paper piece on the left side of the folding baseline according to a preset first folding line so that the first edge line falls on the right side of the folding baseline, folding the part of the base paper piece on the right side of the folding baseline according to a preset second folding line so that the second edge line falls on the left side of the folding baseline and the first edge line, and pressing part of the surface of the second folding portion onto the first folding portion;

performing a first plastic sealing on a gap between an overlapping area of the second folding portion and the first folding portion so as to form a paper roll with two ends open and side surfaces enclosed;

supporting the paper roll and performing side pressing on the paper roll along a first side pressing line preset on the paper roll so that the paper roll is embedded to form a first closing and a third folding line, wherein the area between the first folding line and the first side pressing line serves as a bottom surface of the first closing, and the area between the first side pressing line and the third folding line serves as a top surface of the first closing;

performing side pressing on the paper roll along a second side pressing line preset on the paper roll so that the paper roll is embedded to form a second closing and a fourth folding line, wherein the area between the second folding line and the second side pressing line serves as a bottom surface of the second closing, and the area between the second side pressing line and the fourth folding line serves as a top surface of the second closing;

fully pressing the paper roll to remove air so that a projection of the third folding line falls on the first folding line and a projection of the fourth folding line falls on the second folding line;

plastically sealing the bottom opening of the fully pressed paper roll according to a preset bottom folding line to form a finished sealed bag.

2. The processing method of a sealed bag based on a folding process of claim 1, wherein a part of the surface of the second folding portion is pressed on the first folding portion to form a sealing portion having a width of 1-5 cm.

3. A sealed bag based on a folding process, manufactured by the processing method of a sealed bag based on a folding process of claim 2, wherein the sealed bag comprises a first closing and a second closing arranged at two sides of a bag body, the first closing comprises a bottom surface and a top surface which are symmetrical according to a first side pressing line, two sides of the bottom surface of the first closing are a first side pressing line and a first folding line, respectively, and two sides of the top surface of the first closing are a first side pressing line and a third folding line, respectively; the second closing comprises a bottom surface and a top surface which are symmetrical according to a second side pressing line, two sides of the bottom surface of the second closing are a second side pressing line and a second folding line, respectively, and two sides of the top surface of the first closing are a second side pressing line and a fourth folding line, respectively.

4. The sealed bag based on a folding process of claim 3, wherein the sealed bag comprises a bottom plastic sealing area arranged at the bottom of the bag body, the bottom plastic sealing area plastically seals the bottom opening of the fully pressed paper roll according to a preset bottom folding line.

5. The sealed bag based on a folding process of claim 3, wherein the area of the top surface and bottom surface of the first closing is equal, the area of the top surface and bottom surface of the second closing is equal, the area of the top surface of the first closing and the area of the top surface of the second closing is equal, and the area of the top surface of the first closing is 10%-20% of the area of the first folding portion.

6. The processing method of a sealed bag based on a folding process of claim 1, wherein prior to the first plastic sealing, the method further comprises: the area where the second folding portion overlaps the first folding portion is provided as a gumming area, and the gumming area is coated with a plastic sealant, and the width of the gumming area is 2-6 cm.

7. The processing method of a sealed bag based on a folding process of claim 6, wherein the first plastic sealing comprises thermocompression, the thermocompression temperature is 100-350° C. and the thermocompression pressure is 8-20 $kg/dm^2$.

8. The processing method of a sealed bag based on a folding process of claim 7, wherein the time period of the thermocompression is 1-4 seconds.

9. A sealed bag based on a folding process, manufactured by the processing method of a sealed bag based on a folding process of claim 7, wherein the sealed bag comprises a first closing and a second closing arranged at two sides of a bag body, the first closing comprises a bottom surface and a top surface which are symmetrical according to a first side pressing line, two sides of the bottom surface of the first closing are a first side pressing line and a first folding line, respectively, and two sides of the top surface of the first closing are a first side pressing line and a third folding line, respectively; the second closing comprises a bottom surface and a top surface which are symmetrical according to a second side pressing line, two sides of the bottom surface of the second closing are a second side pressing line and a second folding line, respectively, and two sides of the top surface of the first closing are a second side pressing line and a fourth folding line, respectively.

10. The sealed bag based on a folding process of claim 9, wherein the sealed bag comprises a bottom plastic sealing area arranged at the bottom of the bag body, the bottom plastic sealing area plastically seals the bottom opening of the fully pressed paper roll according to a preset bottom folding line.

11. The sealed bag based on a folding process of claim 9, wherein the area of the top surface and bottom surface of the first closing is equal, the area of the top surface and bottom surface of the second closing is equal, the area of the top surface of the first closing and the area of the top surface of the second closing is equal, and the area of the top surface of the first closing is 10%-20% of the area of the first folding portion.

12. A sealed bag based on a folding process, manufactured by the processing method of a sealed bag based on a folding process of claim 6, wherein the sealed bag comprises a first closing and a second closing arranged at two sides of a bag body, the first closing comprises a bottom surface and a top surface which are symmetrical according to a first side pressing line, two sides of the bottom surface of the first closing are a first side pressing line and a first folding line, respectively, and two sides of the top surface of the first closing are a first side pressing line and a third folding line, respectively; the second closing comprises a bottom surface and a top surface which are symmetrical according to a second side pressing line, two sides of the bottom surface of the second closing are a second side pressing line and a second folding line, respectively, and two sides of the top surface of the first closing are a second side pressing line and a fourth folding line, respectively.

13. The sealed bag based on a folding process of claim 12, wherein the sealed bag comprises a bottom plastic sealing area arranged at the bottom of the bag body, the bottom plastic sealing area plastically seals the bottom opening of the fully pressed paper roll according to a preset bottom folding line.

14. The sealed bag based on a folding process of claim 12, wherein the area of the top surface and bottom surface of the first closing is equal, the area of the top surface and bottom surface of the second closing is equal, the area of the top surface of the first closing and the area of the top surface of the second closing is equal, and the area of the top surface of the first closing is 10%-20% of the area of the first folding portion.

15. A sealed bag based on a folding process, manufactured by the processing method of a sealed bag based on a folding process of claim 1, wherein the sealed bag comprises a first closing and a second closing arranged at two sides of a bag body, the first closing comprises a bottom surface and a top surface which are symmetrical according to a first side pressing line, two sides of the bottom surface of the first closing are a first side pressing line and a first folding line, respectively, and two sides of the top surface of the first closing are a first side pressing line and a third folding line, respectively; the second closing comprises a bottom surface and a top surface which are symmetrical according to a second side pressing line, two sides of the bottom surface of the second closing are a second side pressing line and a second folding line, respectively, and two sides of the top surface of the first closing are a second side pressing line and a fourth folding line, respectively.

16. The sealed bag based on a folding process of claim 15, wherein the sealed bag comprises a bottom plastic sealing area arranged at the bottom of the bag body, the bottom plastic sealing area plastically seals the bottom opening of the fully pressed paper roll according to a preset bottom folding line.

17. The sealed bag based on a folding process of claim 15, wherein the area of the top surface and bottom surface of the first closing is equal, the area of the top surface and bottom surface of the second closing is equal, the area of the top surface of the first closing and the area of the top surface of the second closing is equal, and the area of the top surface of the first closing is 10%-20% of the area of the first folding portion.

* * * * *